US009863509B2

(12) United States Patent
Torii et al.

(10) Patent No.: US 9,863,509 B2
(45) Date of Patent: Jan. 9, 2018

(54) POWER TRANSMISSION DEVICE

(71) Applicant: AISIN AW CO., LTD., Anjo-shi, Aichi-ken (JP)

(72) Inventors: Takeshi Torii, Chiryu (JP); Ryota Wada, Kariya (JP); Akihito Hattori, Anjo (JP)

(73) Assignee: Aisin AW CO., LTD., Anjo (JP)

( * ) Notice: Subject to any disclaimer, the term of this patent is extended or adjusted under 35 U.S.C. 154(b) by 237 days.

(21) Appl. No.: 14/902,209

(22) PCT Filed: Sep. 16, 2014

(86) PCT No.: PCT/JP2014/074417
§ 371 (c)(1),
(2) Date: Dec. 30, 2015

(87) PCT Pub. No.: WO2015/037738
PCT Pub. Date: Mar. 19, 2015

(65) Prior Publication Data
US 2016/0356364 A1    Dec. 8, 2016

(30) Foreign Application Priority Data

Sep. 13, 2013    (JP) .................................. 2013-190663

(51) Int. Cl.
*F16H 3/66*        (2006.01)
*F16H 57/08*       (2006.01)
(Continued)

(52) U.S. Cl.
CPC ............. *F16H 3/663* (2013.01); *F16H 37/04* (2013.01); *F16H 57/021* (2013.01); *F16H 57/04* (2013.01);
(Continued)

(58) Field of Classification Search
CPC ...................................................... F16H 3/663
See application file for complete search history.

(56) References Cited

U.S. PATENT DOCUMENTS

| 9,429,226 B2* | 8/2016 | Ike ......................... F16H 57/082 |
| 9,719,579 B2* | 8/2017 | Torii ........................ F16H 3/663 |
| 2014/0364276 A1* | 12/2014 | Tachibanada ......... B60W 10/10 |
| | | 477/93 |

FOREIGN PATENT DOCUMENTS

| JP | H07-269667 A | 10/1995 |
| JP | 2002-349683 A | 12/2002 |

(Continued)

*Primary Examiner* — Derek D Knight
(74) *Attorney, Agent, or Firm* — Oliff PLC

(57) ABSTRACT

A power transmission device including a transmission, a case housing the transmission, a brake including a plurality of frictional engaging plates and a piston for pressing the frictional engaging plates and configured to non-rotatably hold any one of rotation elements of the transmission stationary to the case, and a support fixed to the case and including a ring-shaped wall portion extending in a radial direction of the transmission, a drum portion extending from the ring-shaped wall portion in an axial direction of the transmission and non-rotatably supporting a part of the frictional engaging plates, and a boss portion extending from the ring-shaped wall portion toward a side opposite to the frictional engaging plates in the axial direction and rotatably supporting another rotation element of the power transmission device.

20 Claims, 5 Drawing Sheets

(51) Int. Cl.
*F16H 57/021* (2012.01)
*F16H 57/04* (2010.01)
*F16H 37/04* (2006.01)
*F16H 63/30* (2006.01)

(52) U.S. Cl.
CPC ..... *F16H 57/0424* (2013.01); *F16H 57/0471* (2013.01); *F16H 57/08* (2013.01); *F16H 3/666* (2013.01); *F16H 63/3043* (2013.01); *F16H 2057/087* (2013.01); *F16H 2200/006* (2013.01); *F16H 2200/0086* (2013.01); *F16H 2200/202* (2013.01); *F16H 2200/2046* (2013.01); *F16H 2200/2082* (2013.01)

(56) References Cited

FOREIGN PATENT DOCUMENTS

| | | |
|---|---|---|
| JP | 2003-106421 A | 4/2003 |
| JP | 2007-192366 A | 8/2007 |
| JP | 2012-251645 A | 12/2012 |

\* cited by examiner

FIG. 2

|   |      | C-1 | C-2 | C-3 | C-4 | B-1 | B-2 | F-1 |
|---|------|-----|-----|-----|-----|-----|-----|-----|
| D | 1st  | ○   |     |     |     |     | ●   | ○   |
|   | 2nd  | ○   |     |     |     | ○   |     |     |
|   | 3rd  | ○   |     | ○   |     |     |     |     |
|   | 4th  | ○   |     |     | ○   |     |     |     |
|   | 5th  | ○   | ○   |     |     |     |     |     |
|   | 6th  |     | ○   |     | ○   |     |     |     |
|   | 7th  |     | ○   | ○   |     |     |     |     |
|   | 8th  |     | ○   |     |     | ○   |     |     |
| REV1 |  |     |     | ○   |     |     | ○   |     |
| REV2 |  |     |     |     | ○   |     | ○   |     |

※○: ENGAGED
●: ENGAGED DURING ENGINE BRAKING

POWER TRANSMISSION DEVICE

BACKGROUND

The present disclosure relates to a power transmission device including a transmission, a case housing the transmission, and a brake that has a plurality of frictional engaging plates and a piston for pressing the frictional engaging plates and is configured to non-rotatably hold any of rotation elements of the transmission stationary to the case.

As a power transmission device of this type in the related art, a known power transmission device includes a speed change mechanism having a brake of a multi-plate friction type that can non-rotatably hold a sun gear of a reduction planetary gear stationary to a transmission case, a counter drive gear to which power from the speed change mechanism is transmitted, and a center support fastened to the transmission case with a bolt and rotatably supporting a counter drive gear through a bearing (see, for example, Japanese Patent Application Publication No. 2002-349683). A brake drum constituting the brake of this power transmission device includes a radial flange extending radially inward from one end of the brake drum. The radial flange has internal teeth on an inner peripheral portion thereof. The brake drum is non-rotatably held stationary to the center support by fitting the internal teeth to projections formed on a wall surface of an outer peripheral portion of the center support.

SUMMARY

In the power transmission device in the related art, part of hydraulic oil for lubricating and cooling to be supplied to a bearing disposed between the center support and the counter drive gear, for example, may flow to the inner side of the brake drum along the surface of the center support, and enter a space between frictional engaging plates of the brake. If a relatively large amount of hydraulic oil is present between the frictional engaging plates, large drag torque may be generated between the frictional engaging plates while the brake is disengaged, resulting in the possibility of a large loss occurring in the power transmission device.

In view of this, an exemplary aspect of the present disclosure is to more suitably suppress generation of drag torque while a brake for non-rotatably holding a rotation element of a transmission is disengaged and to further reduce a loss occurring in a power transmission device.

A power transmission device according to an exemplary aspect of the present disclosure is a power transmission device including a transmission, a case housing the transmission, a brake including a plurality of frictional engaging plates and a piston for pressing the frictional engaging plates and configured to non-rotatably hold any one of rotation elements of the transmission stationary to the case, and a support fixed to the case and including a ring-shaped wall portion extending in a radial direction of the transmission, a drum portion extending from the ring-shaped wall portion in an axial direction of the transmission and non-rotatably supporting a part of the frictional engaging plates, and a boss portion extending from the ring-shaped wall portion toward a side opposite to the frictional engaging plates in the axial direction and rotatably supporting another rotation element of the power transmission device, wherein the ring-shaped wall portion of the support includes a through hole through which a first space closer to the frictional engaging plates than the ring-shaped wall portion is communicates with a second space closer to the other rotation element than the ring-shaped wall portion is, and an opening of the through hole facing the first space is located radially inward of the frictional engaging plates and an opening of the through hole facing the second space is located below the other rotation element.

The power transmission device includes a brake including the frictional engaging plates and the piston for pressing the frictional engaging plates and configured to non-rotatably hold any one of rotation elements of the transmission stationary to the case housing the transmission, and also includes the support fixed to the case and rotatably supporting another rotation element included in the power transmission device. The support includes the ring-shaped wall portion extending in the radial direction of the transmission, the drum portion extending from the ring-shaped wall portion in the axial direction of the transmission and non-rotatably supporting a part of the frictional engaging plates, and the boss portion extending from the ring-shaped wall portion toward the side opposite to the frictional engaging plates in the axial direction and rotatably supporting another rotation element included in the power transmission device. The ring-shaped wall portion of the support includes the through hole through which the first space closer to the frictional engaging plates than the ring-shaped wall portion is communicates with the second space located closer to another rotation element than the ring-shaped wall portion is. The opening of the through hole facing the first space is located radially inward of the frictional engaging plates and the opening of the through hole facing the second space is located below the other rotation element. In this manner, hydraulic oil flowing along a surface of the ring-shaped wall portion facing the first space can be discharged to the second space (to the outside of the drum portion) in which the other rotation element is disposed through the through hole formed in the ring-shaped wall portion. As a result, it is possible to more favorably suppress a flow of the hydraulic oil, which has flowed along the surface of the ring-shaped wall portion, toward the first space (toward the inside of the drum portion), that is, toward the frictional engaging plates, and into a space between the frictional engaging plates when the brake is disengaged. Thus, in this power transmission device, generation of drag torque while the brake for non-rotatably holding any one of rotation elements of the transmission stationary to the case housing the transmission can be more favorably suppressed, thereby further reducing a loss occurring in the power transmission device.

The ring-shaped wall portion of the support may include a ring-shaped piston support portion extending in the axial direction on the radially inner side of the drum portion, and supporting the piston on an outer peripheral surface of the piston support portion, and an oil collecting portion located radially inward of the outer peripheral surface of the piston support portion, and the opening of the through hole facing the first space may communicate with the oil collecting portion. In this manner, the hydraulic oil flowing along the surface of the ring-shaped wall portion of the support can be collected in the oil collecting portion, and can be discharged from the oil collecting portion to the second space (to the outside of the drum portion) through the through hole formed in the ring-shaped wall portion.

The through hole may be formed to be tilted in such a manner that the opening of the through hole facing the second space is located below a bottom surface of the oil collecting portion. This configuration enables the hydraulic oil, which has flowed into the through hole, to be more favorably discharged from the through hole to the second space (to the outside of the drum portion).

The ring-shaped wall portion may have at least one lightening hole penetrating the ring-shaped wall portion, and the oil collecting portion and the through hole may be formed radially outward of the lightening hole in the ring-shaped wall portion. With this configuration, even when the hydraulic oil flows along a portion of radially outer side of the lightening hole formed on the end surface of the ring-shaped wall portion, the hydraulic oil can be collected in the oil collecting portion disposed radially outward of the lightening hole, and can be discharged to the outside of the drum portion through the through hole.

In addition, the other rotation element may be a counter drive gear to which power is transmitted from the transmission, and the opening of the through hole facing the second space may be located below the counter drive gear. This configuration can favorably suppress rebound of the hydraulic oil, which has flowed from the opening of the through hole facing the second space and struck the counter drive gear, and return into the first space, that is, a space in which the brake is disposed, through the through hole.

The other rotation element may be supported by an outer peripheral surface of the boss portion through a bearing, the boss portion includes a lubricating hole for supplying lubricating oil to the bearing, and the lubricating oil may be supplied from the radially inner side of the boss portion to the lubricating hole.

The brake may include a return spring for biasing the piston and a spring support member supporting the return spring and fixed to the support, and the spring support member may include a ring-shaped support portion supporting one end of the return spring and an oil collecting wall extending from the ring-shaped support portion and facing the through hole with an interval between the through hole and the oil collecting wall. This configuration enables the hydraulic oil, which has flowed along the surface of the ring-shaped wall portion of the support facing the first space, to more favorably flow into the through hole and also enables the oil collecting wall to further restrict a flow of the hydraulic oil in the through hole toward the frictional engaging plates. As a result, it is possible to more favorably suppress a flow of the hydraulic oil into the first space (to the inside of the drum portion) and into a space between the frictional engaging plates while the brake is disengaged.

BRIEF DESCRIPTION OF THE DRAWINGS

FIG. 2 is an operation table showing a relationship between shift speeds of an automatic transmission included in the power transmission device illustrated in FIG. 1 and operating states of clutches and brakes.

DETAILED DESCRIPTION OF EMBODIMENTS

An embodiment of the present disclosure will be described hereinafter with reference to the drawings.

Figure 1:
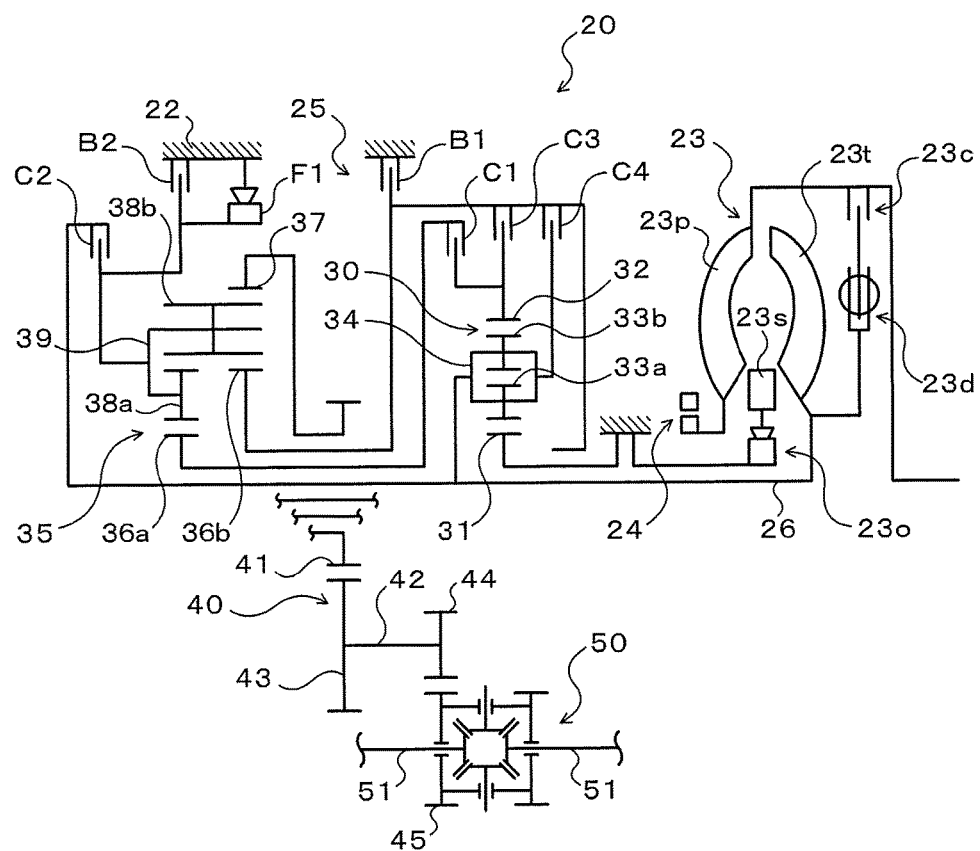
FIG. 1 schematically illustrates a configuration of a power transmission device according to an embodiment of the present disclosure.

FIG. 1 schematically illustrates a configuration of a power transmission device 20 according to an embodiment of the present disclosure. The power transmission device 20 illustrated in FIG. 1 is connected to a crankshaft of an engine (not shown) installed in a front-wheel-drive vehicle, and can transmit power from the engine to left and right drive wheels (front wheels) (not shown). As illustrated in FIG. 1, the power transmission device 20 includes a transmission case 22, a starting device (fluid transmission device) 23 housed in the transmission case 22, an oil pump 24, an automatic transmission 25, a gear mechanism (gear train) 40, and a differential gear (differential mechanism) 50, for example.

The starting device 23 included in the power transmission device 20 is configured as a torque converter including, for example, an input-side pump impeller $23p$ connected to the crankshaft of the engine, an output-side turbine runner $23t$ connected to an input shaft (input member) 26 of the automatic transmission 25, a stator $23s$ disposed inside the pump impeller $23p$ and the turbine runner $23t$ to rectify a flow of hydraulic oil from the turbine runner $23t$ to the pump impeller $23p$, a one-way clutch $23o$ restricting a rotation direction of the stator $23s$ to one direction, a lockup clutch $23c$, and a damper mechanism $23d$. The starting device 23 may be configured as a fluid coupling that does not include the stator $23s$.

The oil pump 24 is configured as a gear pump including, for example, a pump assembly including a pump body and a pump cover, an external gear connected to the pump impeller $23p$ of the starting device 23 through a hub, and an internal gear meshing with the external gear. The oil pump 24 is driven with power from the engine, intakes hydraulic oil (ATF) stored in an oil pan (not shown), and pumps the hydraulic oil to a hydraulic control device (not shown) that generates a hydraulic pressure required by the starting device 23 and the automatic transmission 25.

The automatic transmission 25 is configured as an eight-speed transmission. As illustrated in FIG. 1, the automatic transmission 25 includes a double pinion type first planetary gear mechanism 30, a Ravigneaux type second planetary gear mechanism 35, four clutches C1, C2, C3, and C4 for changing a power transmission path from an input side to an output side, two brakes B1 and B2, and a one-way clutch F1, as well as the input shaft 26.

The first planetary gear mechanism 30 of the automatic transmission 25 includes a sun gear 31 that is an external gear, a ring gear 32 that is an internal gear concentrically disposed with the sun gear 31, and a planetary carrier 34 rotatably (turnably) and revolvably holding a plurality of pairs of two meshing pinion gears $33a$ and $33b$ one of which meshes with the sun gear 31 and the other of which is meshes with the ring gear 32. As illustrated in FIG. 1, the sun gear 31 of the first planetary gear mechanism 30 is held stationary to the transmission case 22, and the planetary carrier 34 of the first planetary gear mechanism 30 is coupled to the input shaft 26 in such a manner that the planetary carrier 34 and the input shaft 26 can rotate as one unit. The first planetary gear mechanism 30 is configured as a so-called reduction gear, reduces the speed of power transmitted to the planetary carrier 34 as an input element, and outputs the power from the ring gear 32 as an output element.

The second planetary gear mechanism 35 of the automatic transmission 25 includes a first sun gear $36a$ and a second sun gear $36b$ that are external gears, a ring gear 37 that is an internal gear concentrically disposed with the first and second sun gears $36a$ and $36b$, a plurality of short pinion gears $38a$ meshing with the first sun gear $36a$, a plurality of long pinion gears 38b meshing with the second sun gear 36b and the short pinion gears 38a and meshing with the ring gear 37, and a planetary carrier 39 rotatably (turnably) and revolvably holding the short pinion gears 38a and the long pinion gears 38b. The ring gear 37 of the second planetary gear mechanism 35 functions as an output member of the automatic transmission 25, and power transmitted from the input shaft 26 to the ring gear 37 is transmitted to the left and right drive wheels through the gear mechanism 40, the differential gear 50, and the drive shaft 51. The planetary carrier 39 is supported by the transmission case 22 through the one-way clutch F1. The rotation direction of the planetary carrier 39 is restricted to one direction by the one-way clutch F1.

The clutch C1 is a multi-plate friction hydraulic clutch (friction engaging element) that includes a hydraulic servo composed of, for example, a piston, friction plates, separator plates, and an oil chamber to which the hydraulic oil is supplied, and connects and disconnects the ring gear 32 of the first planetary gear mechanism 30 to and from the first sun gear 36a of the second planetary gear mechanism 35. The clutch C2 is a multi-plate friction hydraulic clutch that includes a hydraulic servo composed of, for example, a piston, friction plates, separator plates, and an oil chamber to which the hydraulic oil is supplied, and connects and disconnects the input shaft 26 to and from the planetary carrier 39 of the second planetary gear mechanism 35. The clutch C3 is a multi-plate friction hydraulic clutch that includes a hydraulic servo composed of, for example, a piston, friction plates, separator plates, and an oil chamber to which the hydraulic oil is supplied, and connects and disconnects the ring gear 32 of the first planetary gear mechanism 30 to and from the second sun gear 36b of the second planetary gear mechanism 35. The clutch C4 is a multi-plate friction hydraulic clutch that includes a hydraulic servo composed of, for example, a piston, friction plates, separator plates, and an oil chamber to which the hydraulic oil is supplied, and connects and disconnects the planetary carrier 34 of the first planetary gear mechanism 30 to and from the second sun gear 36b of the second planetary gear mechanism 35.

The brake B1 is a multi-plate friction hydraulic brake that includes a hydraulic servo composed of, for example, friction plates 121 and separator plates 122 as frictional engaging plates (see FIG. 3) and an oil chamber to which the hydraulic oil is supplied, and non-rotatably holds the second sun gear 36b of the second planetary gear mechanism 35 stationary to the transmission case 22 and releases the second sun gear 36b of the second planetary gear mechanism 35 held stationary to the transmission case 22. The brake B2 is a multi-plate friction hydraulic brake that includes a hydraulic servo composed of, for example, friction plates, separator plates, and an oil chamber to which the hydraulic oil is supplied, and non-rotatably holds the planetary carrier 39 of the second planetary gear mechanism 35 stationary to the transmission case 22 and releases the planetary carrier 39 of the second planetary gear mechanism 35 held stationary to the transmission case 22.

The one-way clutch F1 includes, for example, an inner race coupled (fixed) to the planetary carrier 39 of the second planetary gear mechanism 35, an outer race, a plurality of sprags, a plurality of springs (leaf springs), and a cage, transmits torque through the sprags when the outer race rotates in one direction relative to the inner race, and when the outer race rotates in the other direction relative to the inner race, allows relative rotation of the inner race and the outer race. The one-way clutch F1 may have a configuration such as a roller type, except the sprag type.

The clutches C1 to C4 and the brakes B1 and B2 operate in response to supply and discharge of the hydraulic oil by the hydraulic control device. FIG. 2 is an operation table showing a relationship between shift speeds of the automatic transmission 25 and operating states of the clutches C1 to C4, the brakes B1 and B2, and the one-way clutch F1. The automatic transmission 25 provides first through eighth forward speeds and first and second reverse speeds by setting the clutches C1 to C4 and the brakes B1 and B2 in the states shown in the operation table of FIG. 2. At least any of the clutches C1 to C4 and the brake B2, except the brake B1, may be a mesh engaging element such as a dog clutch.

The gear mechanism 40 includes a counter drive gear 41 coupled to the ring gear 37 of the second planetary gear mechanism 35 of the automatic transmission 25, a counter driven gear 43 fixed to a counter shaft 42 extending in parallel with the input shaft 26 of the automatic transmission 25 and meshing with the counter drive gear 41, a drive pinion gear (final drive gear) 44 integrally formed with (or fixed to) the counter shaft 42 such that the drive pinion gear 44 is axially separated from the counter driven gear 43, and a differential ring gear (final driven gear) 45 meshing with the drive pinion gear 44 and coupled to the differential gear 50.

Figure 3:
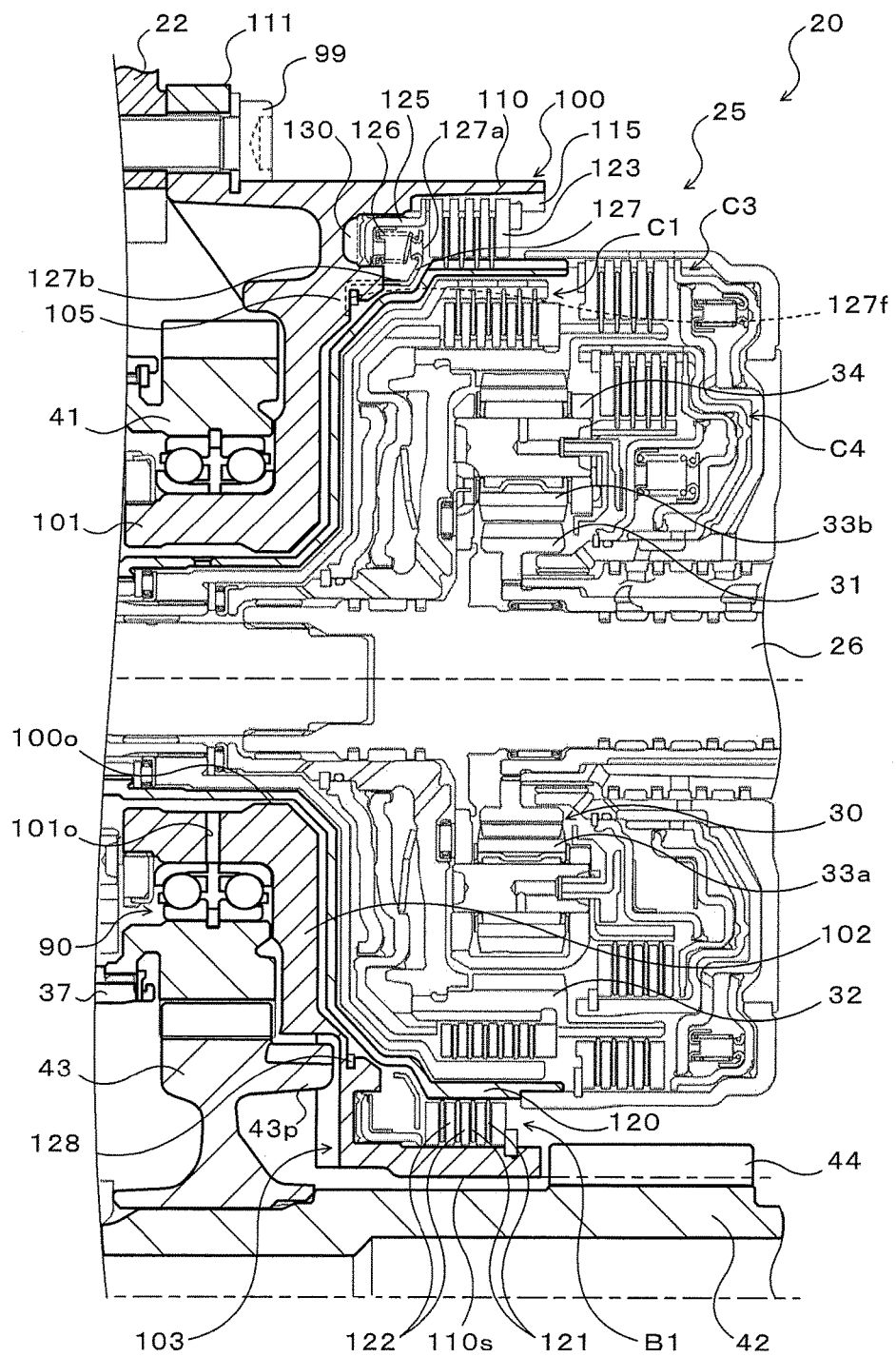
FIG. 3 is an enlarged partial cross sectional view illustrating a main portion of the power transmission device illustrated in FIG. 1.
Figure 4:
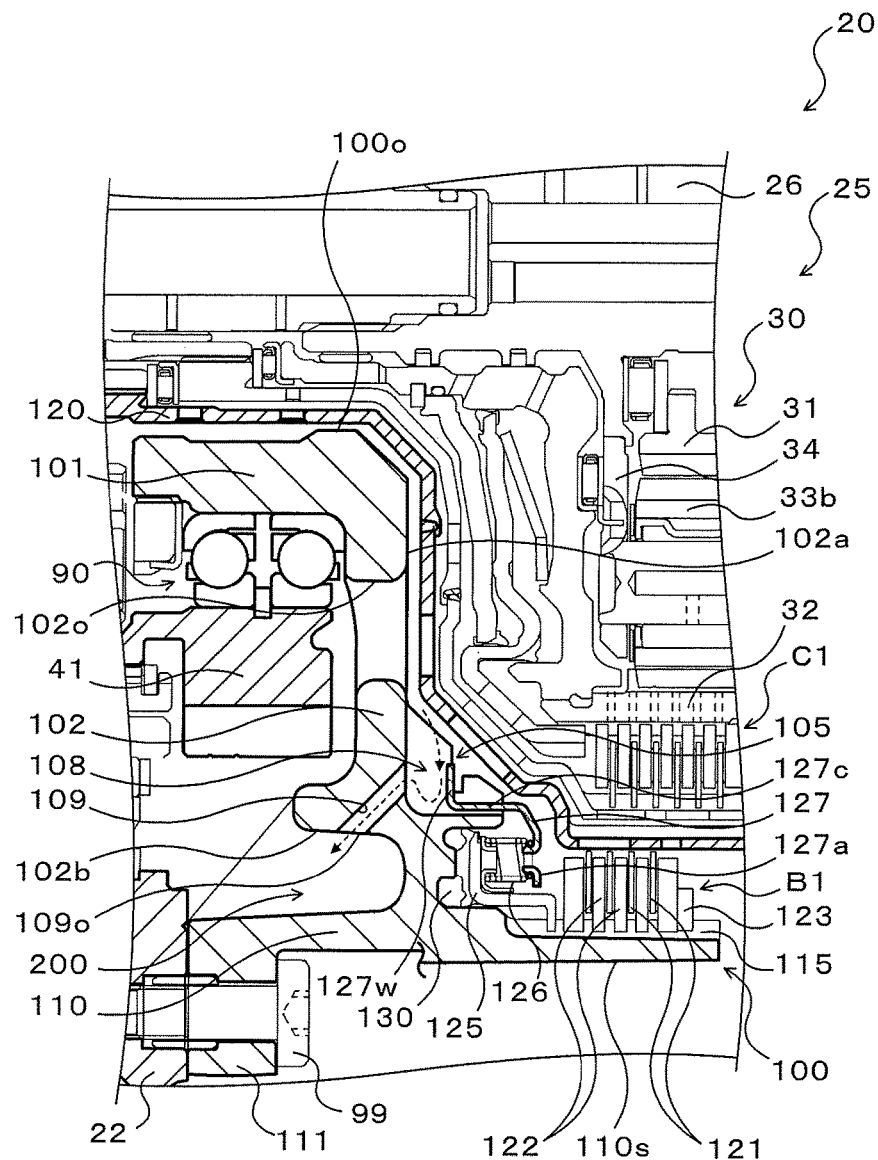
FIG. 4 is an enlarged partial cross sectional view illustrating the main portion of the power transmission device illustrated in FIG. 1.
Figure 5:
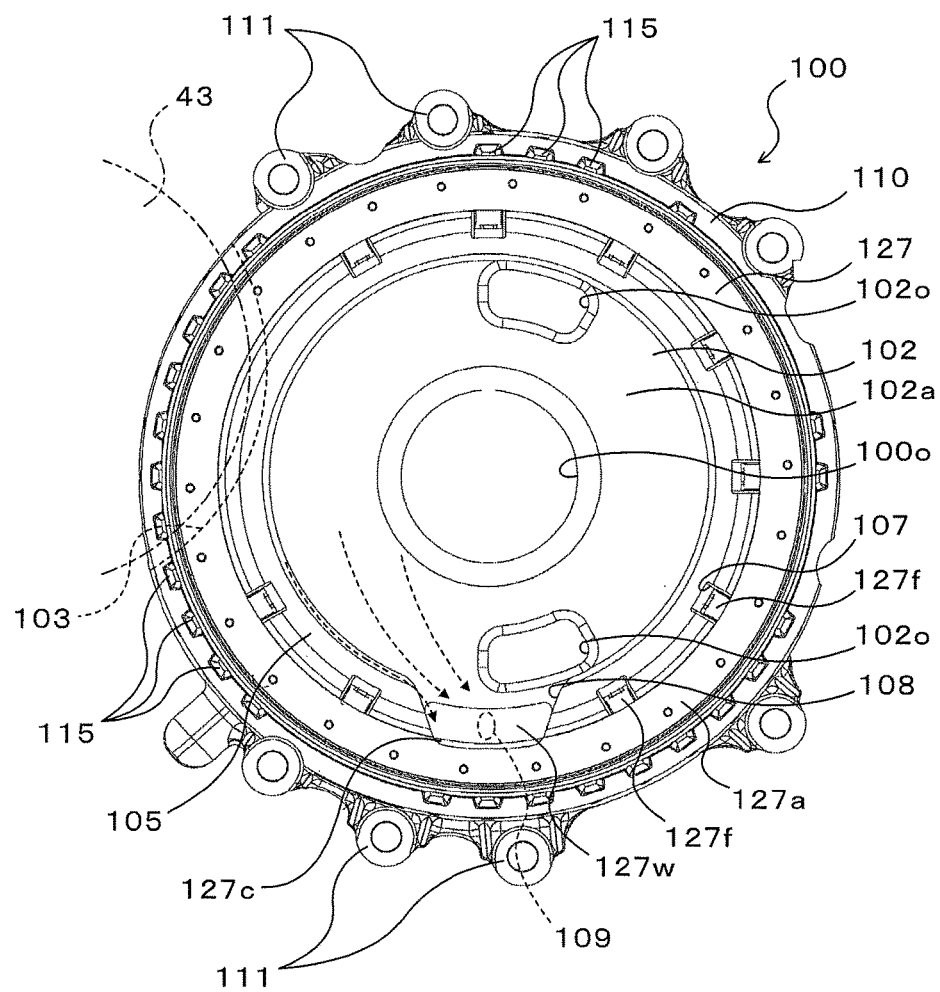
FIG. 5 is a front view illustrating a support member included in the power transmission device illustrated in FIG. 1.

Next, referring to FIGS. 3 to 5, a configuration of the periphery of the counter drive gear 41 of the gear mechanism 40 as a rotation element included in the power transmission device 20 and the brake B1 will be described. In FIGS. 3 to 5, lower sides in the figures correspond to lower sides in the vertical direction.

As illustrated in the figure, the counter drive gear 41 of the gear mechanism 40 is coupled to the ring gear 37 of the second planetary gear mechanism 35, and is rotatably supported by a support member (center support) 100 fixed to the transmission case 22 through a plurality of bolts 99. The support member 100 includes a boss portion 101 rotatably supporting the counter drive gear 41 through a bearing 90 such as a ball bearing or a tapered roller bearing, a substantially disc-shaped ring-shaped wall portion 102 extending from one end of the boss portion 101 outward in a radial direction of the input shaft 26 (a radial direction of the automatic transmission 25), and a cylindrical drum portion 110 extending from the ring-shaped wall portion 102 in an axial direction of the input shaft 26 (an axial direction of the automatic transmission 25). The boss portion 101, the ring-shaped wall portion 102, and the drum portion 110 are formed as one unit by casting or forging an aluminum alloy or other materials, for example.

The boss portion 101 of the support member 100 is located inward of the drum portion 110 and extends from the ring-shaped wall portion 102 toward the side opposite to the first planetary gear mechanism 30 (toward the second planetary gear mechanism 35, the left side in FIG. 3) in the axial direction of the input shaft 26. The boss portion 101 is formed in a cylindrical shape, and has a center hole 100o into which the input shaft 26, for example, is inserted. The inner race of the bearing 90 is fixed to an outer peripheral surface of the boss portion 101. The outer race of the bearing 90 is fixed to an inner peripheral surface of the ring-shaped counter drive gear 41, so that the counter drive gear 41 is rotatably supported by the boss portion 101.

As illustrated in FIG. 3, the ring-shaped wall portion 102 of the support member 100 extends radially outward from an end of the boss portion 101 on the first planetary gear mechanism 30 side, and extends between the boss portion 101 and the drum portion 110. As illustrated in FIG. 3, the ring-shaped wall portion 102 has a recess 103 surrounding a parking gear portion 43p formed in the counter driven gear 43 meshing with the counter drive gear 41. In this manner, the parking gear portion 43p and the recess 103 are disposed close to each other enough to allow the parking gear portion 43p to enter the recess 103 while interference between the support member 100 and the counter driven gear 43 (parking gear portion 43p) is suppressed, thereby enabling the entire power transmission device 20 to be made compact. As illustrated in FIGS. 4 and 5, the ring-shaped wall portion 102 has two lightening holes 102o that penetrate the ring-shaped wall portion 102. This configuration can reduce the weight of the support member 100. It should be noted that the number of the lightening holes 102o is not limited to two, and the lightening holes 102o are not necessarily formed in the ring-shaped wall portion 102.

The drum portion 110 of the support member 100 extends from an outer peripheral portion of the ring-shaped wall portion 102 toward the first planetary gear mechanism 30 (the right side in FIG. 3) in the axial direction of the input shaft 26, and extends from the outer peripheral portion of the ring-shaped wall portion 102 toward the side opposite to the first planetary gear mechanism 30 (the left side in FIG. 3) in the axial direction of the input shaft 26 such that the boss portion 101 is surrounded. The drum portion 110 has a cylindrical outer peripheral surface 110s. A plurality of fastening portions 111 having bolt holes into which the bolts 99 are inserted extend from a portion of the outer peripheral surface 110s at an end (the left end in FIG. 3) of the drum portion 110 on the boss portion 101 side.

The thus-configured drum portion 110 of the support member 100 functions as a brake drum of the brake B1 that non-rotatably holds the second sun gear 36b of the second planetary gear mechanism 35 stationary to the transmission case 22. This configuration in which the cylindrical drum portion 110 is formed as one unit with the support member 100 supporting the counter drive gear 41 allows the drum portion 110 to also function as a rib, so that the strength of the support member 100 can be enhanced. In addition, since the drum portion 110 and the support member 100 are formed as one unit, the number of components can be reduced, and ease of assembly of the automatic transmission 25, and further the power transmission device 20, can be enhanced. The drum portion may be formed as a part separated from the boss portion and the ring-shaped wall portion, and the separated drum portion 110 may be fixed to the ring-shaped wall portion 102.

As illustrated in FIG. 3, the brake B1 using the drum portion 110 of the support member 100 as a brake drum includes a brake hub 120, a plurality of friction plates 121 fitted to the brake hub 120 and movably supported by the brake hub 120, a plurality of separator plates 122 and a backing plate 123 fitted to a spline 115 formed on an inner peripheral surface of the drum portion 110, a piston 125 disposed inside the drum portion 110 and configured to press the friction plates 121 and the separator plates 122 for frictional engagement, a plurality of return springs (coil springs) 126 disposed inside the drum portion 110 and configured to bias the piston 125, and a spring support member 127 disposed inside the drum portion 110 and supporting one end of each of the return springs 126. The return springs 126 of the brake B1 may be a single leaf spring, instead of the plurality of coil springs.

The brake hub 120 is coupled to the second sun gear 36b of the second planetary gear mechanism 35 and the clutch drum for both of the clutches C3 and C4 so as to be rotatable as one unit with the second sun gear 36b and the clutch drum. A spline is formed on an outer peripheral surface of the brake hub 120 and can be engaged with concave and convex portions on inner peripheral portions of the friction plates 121. The friction plates 121 are ring-shaped members each having surfaces, to either of which a friction member is bonded. The separator plates 122 are ring-shaped members each of which is smooth on either surface, and are fitted to the spline 115 of the drum portion 110 in such a manner that the separator plates 122 and the friction plates 121 fitted to the brake hub 120 are alternately arranged side by side. The separator plates 122 are non-rotatably supported by the drum portion 110. The backing plate 123 is fitted to the spline 115 of the drum portion 110 so as to be in contact with the friction plate 121 located at the right side (closest to the first planetary gear mechanism 30) in FIG. 3. The backing plate 123 is supported by a snap ring attached to the drum portion 110 in the axial direction.

The piston 125 is movably supported by the support member 100 and is located closer to the ring-shaped wall portion 102 than the friction plates 121 and the separator plates 122 are. As illustrated in FIG. 3, the ring-shaped wall portion 102 of the support member 100 has a ring-shaped piston support portion 105 extending in the axial direction of the input shaft 26 on the radially inner side of (inside) the drum portion 110, and supporting the piston 125. As illustrated in FIG. 3, the piston support portion 105 extends from the ring-shaped wall portion 102 toward the brake hub 120 (the right side in FIG. 3), that is, toward the side opposite to the boss portion 101 in the axial direction, and has a cylindrical outer peripheral surface supporting an inner peripheral portion of the piston 125 and an inner peripheral surface extending substantially along the outer peripheral surface of the brake hub 120.

Sealing members are each disposed between an outer peripheral portion of the piston 125 and the inner peripheral surface of the drum portion 110, and between the inner peripheral portion of the piston 125 and the outer peripheral surface of the piston support portion 105. In this configuration, the piston 125, the drum portion 110, the piston support portion 105, and the ring-shaped wall portion 102 extending between the drum portion 110 and the piston support portion 105 define an engaging oil chamber 130 to which the hydraulic oil for engaging the brake B1 is supplied. The hydraulic oil from the hydraulic control device is supplied to the engaging oil chamber 130 through an oil passage (not shown) formed in the support member 100, so that the piston 125 moves between the drum portion 110 and the piston support portion 105 to press the friction plates 121 and the separator plates 122, and causes frictional engagement between the friction plates 121 and the separator plates 122.

As illustrated in FIGS. 3 and 5, the spring support member 127 includes a ring-shaped support portion 127a having a plurality of fitting portions each fitted to one end of the corresponding return spring 126, and a plurality of extending portions 127b circumferentially spaced from the ring-shaped support portion 127a with intervals, extending toward the ring-shaped wall portion 102, and having substantially rectangular free end portions 127f extending radially inward. As illustrated in FIG. 5, the piston support portion 105 formed on the ring-shaped wall portion 102 of the support member 100 includes a plurality of contact recesses 107 each formed to support side surfaces, at both sides, of the corresponding free end portion 127f of the spring support member 127. In this embodiment, as illustrated in FIG. 5, the contact recesses 107 are formed so as to be evenly spaced from each other in the piston support portion 105 except for a lower portion of the piston support portion 105 in the vertical direction and the inside of the recess 103. Correspondingly, the extending portions 127*b* in the same number as the contact recesses 107 of the ring-shaped wall portion 102 extend from the ring-shaped support portion 127*a* of the spring support member 127.

As illustrated in FIG. 5, the spring support member 127 is disposed relative to the ring-shaped wall portion 102 in such a manner that the free end portion 127*f* of the extending portion 127*b* is supported by the corresponding one of the contact recesses 107 with the return springs 126 being supported by the ring-shaped support portion 127*a*. The spring support member 127 is retained on the ring-shaped wall portion 102 so as not to be detached from the ring-shaped wall portion 102, by the snap ring 128 attached to a snap ring groove formed in the piston support portion 105. In this manner, the spring support member 127 supporting the return springs 126 is fixed to the support member 100. The return springs 126 biases the piston 125 to cause the piston 125 to separate from the friction plates 121 and the separator plates 122. When a hydraulic pressure supplied from the hydraulic control device to the engaging oil chamber 130 decreases, the piston 125 is separated from the friction plates 121 and the separator plates 122 under biasing force of the return springs 126, thereby disengaging the brake B1.

In the thus-configured power transmission device 20, the hydraulic oil as the lubricating medium and cooling medium is supplied to the bearing 90 disposed between the boss portion 101 and the counter drive gear 41, through an oil hole 101*o* formed in the boss portion 101. Thus, the hydraulic oil that did not flow into, for example, the oil hole 101*o* flows in the periphery of the support member 100, and part of the hydraulic oil in the periphery of the support member 100 flows to the inside of the drum portion 110 along a surface 102*a* of the ring-shaped wall portion 102 on the brake hub 120 side (the piston support portion 105, that is, the brake B1 side, the right side in FIG. 4). If a relatively large amount of hydraulic oil flows to the inside of the drum portion 110 and a relatively large amount of hydraulic oil is present between the friction plates 121 and the separator plates 122 while the brake B1 is disengaged, large drag torque is generated between the friction plates 121 and the separator plates 122, leading to the possibility of a large loss occurring in the power transmission device 20.

In view of this, as illustrated in FIGS. 4 and 5, the ring-shaped wall portion 102 of the support member 100 includes an oil collecting portion 108 for suppressing a flow of the hydraulic oil to the inside of the drum portion 110 along the surface 102*a* of the ring-shaped wall portion 102 on the brake hub 120 side (the piston support portion 105 side). The oil collecting portion 108 is formed radially inward of the outer peripheral surface of the piston support portion 105. The oil collecting portion 108 is recessed outward in the radial direction of the piston support portion 105 on the inner peripheral surface of the piston support portion 105. That is, the oil collecting portion 108 is formed in a lower portion of the piston support portion 105 so as to be recessed from the radially inner side to the radially outer side of the piston support portion 105 (from the inner peripheral surface of the piston support portion 105 toward the outer peripheral surface thereof). The oil collecting portion 108 is located in the ring-shaped wall portion 102 radially outward of the lightening holes 102*o* formed in the ring-shaped wall portion 102. In this embodiment, as illustrated in FIG. 4, the oil collecting portion 108 extends from an end surface of the piston support portion 105 on the brake hub 120 side (the right side in FIG. 4) to the surface 102*a* of the ring-shaped wall portion 102. As illustrated in FIG. 5, the oil collecting portion 108 has two side surfaces that are tilted to be closer to each other from the center of the support member 100 (center hole 100*o*) toward the drum portion 110. The oil collecting portion 108 is located directly below the center hole 100*o* of the support member 100 in the vertical direction as seen from the axial direction of the input shaft 26.

The ring-shaped wall portion 102 also has a through hole 109 through which a space (second space) 200 located at a side opposite to the oil collecting portion 108 with the ring-shaped wall portion 102 disposed therebetween communicates with the oil collecting portion 108. As illustrated in FIG. 4, the through hole 109 is open at the surface 102*a* of the ring-shaped wall portion 102 on the brake hub 120 side (the piston support portion 105 side), and is open at a surface 102*b* of the ring-shaped wall portion 102 opposite to the brake hub 120 and the piston support portion 105. That is, the through hole 109 enables a space (first space) closer to the friction plates 121 and the separator plates 122 than the ring-shaped wall portion 102 is to communicate with the space (second space) 200 closer to the counter drive gear 41 than the ring-shaped wall portion is. The through hole 109 is tilted in such a manner that the opening on the brake B1 side (the first space side) is located radially inward of the friction plates 121 and the separator plates 122 (the boss portion 101 side) and that an opening 109*o* facing the space 200 (the surface 102*b* side) is located below a bottom surface of the oil collecting portion 108. That is, the through hole 109 extends obliquely downward in the ring-shaped wall portion 102 from the surface 102*a* of the ring-shaped wall portion 102. In addition, as illustrated in FIG. 4, the opening 109*o* of the through hole 109 facing the space 200 (the side opposite to the oil collecting portion 108) is located vertically below the counter drive gear 41, more specifically vertically below the counter drive gear 41 and the counter driven gear 43 (see FIG. 5). In this embodiment, as illustrated in FIG. 5, the through hole 109 is located directly below the center hole 100*o* of the support member 100 in the vertical direction as seen from the axial direction of the input shaft 26, and is located in the ring-shaped wall portion 102 radially outward of the lightening holes 102*o* formed in the ring-shaped wall portion 102, in a manner similar to the oil collecting portion 108. The oil collecting portion 108 and the through hole 109 may be located at positions slightly offset in the left-right direction in FIG. 5 from the position directly below the center hole 100*o* of the support member 100 in the vertical direction as seen from the axial direction of the input shaft 26.

As illustrated in FIGS. 4 and 5, the spring support member 127 of the brake B1 includes an oil collecting wall 127*w* extending from the ring-shaped support portion 127*a* to face the through hole 109 with an interval therebetween. The oil collecting wall 127*w* extends further radially inward from the extending portion 127*c* extending from the ring-shaped support portion 127*a* toward the ring-shaped wall portion 102 in the axial direction. As illustrated in FIGS. 4 and 5, the oil collecting wall 127*w* and the extending portion 127*c* are formed so as to fit in the oil collecting portion 108 when the spring support member 127 is fixed to the support member 100.

In this manner, as indicated by broken arrows in FIGS. 4 and 5, the hydraulic oil flowing along the surface 102*a* of the ring-shaped wall portion 102 and the inner peripheral surface of the piston support portion 105 is collected in the oil collecting portion 108 formed in the piston support portion 105, and the oil collecting wall 127w restricts a flow of the hydraulic oil, which has flowed into the oil collecting portion 108, toward the friction plates 121 and the separator plates 122 fitted to the drum portion 110. That is, the oil collecting portion 108 and the oil collecting wall 127w form a dam structure that temporarily stores the hydraulic oil, and the hydraulic oil stored between the oil collecting portion 108 and the oil collecting wall 127w is discharged to the space 200 at the side of the ring-shaped wall portion 102 opposite to the brake B1 (the side opposite to the oil collecting portion 108), that is, to the outside of the drum portion 110, through the through hole 109 communicating with the oil collecting portion 108. At this time, the opening 109o of the through hole 109 facing the space 200 is located below the bottom surface of the oil collecting portion 108, so that the hydraulic oil collected in the oil collecting portion 108 can be more favorably discharged to the space 200, that is, to the outside of the drum portion 110, through the through hole 109. As a result, the hydraulic oil flows to the inside of the drum portion 110, that is, toward the friction plates 121 and the separator plates 122, and it is possible to favorably suppress a flow of the hydraulic oil into a space between the friction plates 121 and the separator plates 122 while the brake B1 is disengaged.

In addition, since the oil collecting portion 108 and the through hole 109 are formed radially outward of the lightening holes 102o of the ring-shaped wall portion 102, even when the hydraulic oil flows along a radially outer side of the lightening holes 102o formed in the surface 102a of the ring-shaped wall portion 102, the hydraulic oil can be collected in the oil collecting portion 108 and can be discharged to the space 200 at the side of the ring-shaped wall portion 102 opposite to the brake B1 through the through hole 109, that is, to the outside of the drum portion 110. Furthermore, since the opening 109o of the through hole 109 facing the space 200 is located below the counter drive gear 41, it is possible to favorably suppress rebound of the hydraulic oil, which has flowed from the opening 109o and struck the counter drive gear 41, and return to the inside of the drum portion 110 again, that is, toward the friction plates 121 and the separator plates 122, through the through hole 109. Consequently, the power transmission device 20 can further reduce drag torque generated in the brake B1 while the brake B1 is disengaged, thereby further reducing a loss occurring in the automatic transmission 25.

As described above, the power transmission device 20 includes the friction plates 121 and the separator plates 122 as a plurality of frictional engaging plates and the piston 125 for pressing the friction plates 121 and the separator plates 122, and also includes the brake B1 configured to non-rotatably hold the second sun gear 36b of the second planetary gear mechanism 35 as the rotation element of the automatic transmission 25 stationary to the transmission case 22 housing the automatic transmission 25, and the support member 100 fixed to the transmission case 22 and rotatably supporting the counter drive gear 41 as another rotation element included in the power transmission device 20. The support member 100 includes the ring-shaped wall portion 102 extending in the radial direction of the automatic transmission 25 and the drum portion 110 extending from the ring-shaped wall portion 102 in the axial direction of the automatic transmission 25 and non-rotatably supporting the separator plates 122 as a part of the frictional engaging plates of the brake B1. The ring-shaped wall portion 102 of the support member 100 includes the ring-shaped piston support portion 105 extending in the axial direction on the radially inner side of (inside) the drum portion 110, and supporting the piston 125 of the brake B1, and the oil collecting portion 108 formed in the piston support portion 105 and recessed from the radially inner side to the radially outer side in the piston support portion 105. Moreover, the ring-shaped wall portion 102 includes the through hole 109 through which the space 200 located at the side opposite to the oil collecting portion 108 with the ring-shaped wall portion 102 disposed therebetween communicates with the oil collecting portion 108. In this manner, the hydraulic oil flowing along the surface 102a of the ring-shaped wall portion 102 of the support member 100 on the brake B1 side and the inner peripheral surface of the piston support portion 105 can be collected in the oil collecting portion 108 formed in the piston support portion 105, and can be discharged to the outside of the drum portion 110 through the through hole 109 formed in the ring-shaped wall portion 102. As a result, it is possible to more favorably suppress a flow of the hydraulic oil, which has flowed along the surface 102a of the ring-shaped wall portion 102, to the inside of the drum portion 110, that is, toward the friction plates 121 and the separator plates 122, and into a space between the friction plates 121 and the separator plates 122 while the brake B1 is disengaged. Thus, in the power transmission device 20, generation of drag torque can be more favorably suppressed while the brake B1 for non-rotatably holding the second sun gear 36b of the second planetary gear mechanism 35 of the automatic transmission 25 stationary to the transmission case 22 housing the automatic transmission 25 is disengaged, thereby further reducing a loss occurring in the power transmission device 20.

The brake B1 includes the return springs 126 for biasing the piston 125 and the spring support member 127 supporting the return springs 126 and fixed to the support member 100. The spring support member 127 includes the ring-shaped support portion 127a supporting one end of each of the return springs 126, and the oil collecting wall 127w extending from the ring-shaped support portion 127a to face the through hole 109 with an interval therebetween. In this manner, the hydraulic oil flowing along the surface 102a of the ring-shaped wall portion 102 of the support member 100 on the brake B1 side and the inner peripheral surface of the piston support portion 105 can be more favorably caused to flow into the oil collecting portion 108, and the oil collecting wall 127w can further restrict a flow of the hydraulic oil, which has flowed into the oil collecting portion 108, toward the friction plates 121 and the separator plates 122. As a result, it is possible to more favorably suppress a flow of the hydraulic oil to the inner side of the drum portion 110 and into a space between the friction plates 121 and the separator plates 122 while the brake B1 is disengaged.

Furthermore, the through hole 109 is tilted in such a manner that the opening 109o facing the space 200 is located below the bottom surface of the oil collecting portion 108. Thus, the hydraulic oil collected in the oil collecting portion 108 can be more favorably discharged to the space 200 at the side opposite to the oil collecting portion 108 through the through hole 109, that is, to the outside of the drum portion 110.

The ring-shaped wall portion 102 has at least one lightening hole 102o that penetrates the ring-shaped wall portion 102, and the oil collecting portion 108 and the through hole 109 are formed in the ring-shaped wall portion 102 radially outward of the lightening holes 102o. In this manner, even when the hydraulic oil flows along a portion of a radially outer side of the lightening holes 102o formed on the end surface of the ring-shaped wall portion 102, the hydraulic oil can be collected in the oil collecting portion 108 located radially outward of the lightening holes 102$o$, and can be discharged to the outside of the drum portion 110 through the through hole 109.

The support member 100 also includes the boss portion 101 extending from the ring-shaped wall portion 102 toward the side opposite to the piston support portion 105 in the axial direction on the inner side of the piston support portion 105, and rotatably supporting the counter drive gear 41. The opening 109$o$ of the through hole 109 facing the space 200 is located below the counter drive gear 41 and the counter driven gear 43. In this manner, it is possible to more favorably suppress rebound of the hydraulic oil, which has flowed from the opening 109$o$ of the through hole 109 facing the space 200 and struck the counter drive gear 41 and the counter driven gear 43, and return to the space of the ring-shaped wall portion 102 on the brake B1 side through the through hole 109.

The support member 100 may rotatably support any of rotation elements included in the power transmission device 20, which is different from the counter drive gear 41. The present disclosure is also applicable to the brake B2 configured to non-rotatably hold a rotation element included in the automatic transmission 25, which is different from the second sun gear 36$b$ of the second planetary gear mechanism 35, stationary to the transmission case 22. In addition, the extending portion 127$c$ and the oil collecting wall 127$w$ may be omitted in the spring support member 127. The lightening holes 102$o$ may be omitted in the support member 100. Furthermore, the through hole 109 may not be tilted in such a manner that the opening 109$o$ of the through hole 109 facing the space 200 is located below the bottom surface of the oil collecting portion 108 as long as the hydraulic oil collected in the oil collecting portion 108 can be discharged to the outside of the drum portion 110. For example, the through hole 109 may extend from the surface 102$a$ of the ring-shaped wall portion 102 in parallel in the axial direction. The opening 109$o$ of the through hole 109 facing the space 200 may not be located below the counter drive gear 41, and may be disposed to the side of the counter drive gear 41, for example.

Here, the correspondence between main elements of the embodiment and main elements described in "Summary" will be described. Specifically, in the embodiment described above, for example, the power transmission device including the automatic transmission 25, the transmission case 22 housing the automatic transmission 25, and the brake B1 including the friction plates 121 and the separator plates 122 as a plurality of frictional engaging plates and the piston 125 for pressing the friction plates 121 as frictional engaging plates and configured to non-rotatably hold the second sun gear 36$b$ of the second planetary gear mechanism 35 as the rotation element of the automatic transmission 25 stationary to the transmission case 22 corresponds to the "power transmission device." The support member 100 including the ring-shaped wall portion 102 extending in the radial direction of the automatic transmission 25 and the drum portion 110 extending from the ring-shaped wall portion 102 in the axial direction of the automatic transmission 25 and non-rotatably supporting the separator plates 122 as a part of the frictional engaging plates of the brake B1, fixed to the transmission case 22, and rotatably supporting the counter drive gear 41 as another rotation element included in the power transmission device 20 corresponds to the "support." The ring-shaped piston support portion 105 extending from the ring-shaped wall portion 102 in the axial direction on the radially inner side of the drum portion 110, and supporting the piston 125 of the brake B1 corresponds to the "piston support portion." The oil collecting portion 108 formed in the piston support portion 105 and recessed from the radially inner side to the radially outer side of the piston support portion 105 corresponds to the "oil collecting portion." The through hole 109 formed in the ring-shaped wall portion 102 and allowing the space 200 at the side opposite to the oil collecting portion 108 with the ring-shaped wall portion 102 disposed therebetween to communicate with the oil collecting portion 108 corresponds to the "through hole." The return springs 126 configured to bias the piston 125 of the brake B1 corresponds to the "return spring." The spring support member 127 supporting the return springs 126 of the brake B1 and fixed to the support member 100 corresponds to the "spring support member." The ring-shaped support portion 127$a$ supporting one end of each of the return springs 126 corresponds to the "ring-shaped support portion." The oil collecting wall 127$w$ extending from the ring-shaped support portion 127$a$ to face the through hole 109 with an interval therebetween corresponds to the "oil collecting wall." The lightening holes 102$o$ penetrating the ring-shaped wall portion 102 correspond to the "lightening holes."

The embodiment of the present disclosure has been described above. However, the present disclosure is not limited to the embodiment, and can be, of course, variously changed within the scope of the disclosure. The embodiment of the present disclosure is merely a specific example of the disclosure described in "Summary", and is not intended to limit the elements of the disclosure described in "Summary".

INDUSTRIAL APPLICABILITY

The present disclosure is applicable to the industry of manufacturing power transmission devices, for example.

The invention claimed is:

1. A power transmission device comprising:
   a transmission,
   a case housing the transmission,
   a brake including a plurality of frictional engaging plates and a piston for pressing the frictional engaging plates and configured to non-rotatably hold any one of rotation elements of the transmission stationary to the case, and
   a support fixed to the case and including a ring-shaped wall portion extending in a radial direction of the transmission, a drum portion extending from the ring-shaped wall portion in an axial direction of the transmission and non-rotatably supporting a part of the frictional engaging plates, and a boss portion extending from the ring-shaped wall portion toward a side opposite to the frictional engaging plates in the axial direction and rotatably supporting another rotation element of the power transmission device, wherein
   the ring-shaped wall portion of the support includes a through hole through which a first space closer to the frictional engaging plates than the ring-shaped wall portion is communicates with a second space closer to the other rotation element than the ring-shaped wall portion is, and
   an opening of the through hole facing the first space is located radially inward of the frictional engaging plates and an opening of the through hole facing the second space is located below the other rotation element.

2. The power transmission device according to claim 1, wherein the ring-shaped wall portion of the support includes a ring-shaped piston support portion extending in the axial direction on a radially inner side of the drum portion, and supporting the piston on an outer peripheral surface of the piston support portion, and an oil collecting portion formed radially inward of the outer peripheral surface of the piston support portion, and the opening of the through hole facing the first space communicates with the oil collecting portion.

3. The power transmission device according to claim 2, wherein the through hole is formed to be tilted in such a manner that the opening of the through hole facing the second space is located below a bottom surface of the oil collecting portion.

4. The power transmission device according to claim 3, wherein the ring-shaped wall portion has at least one lightening hole penetrating the ring-shaped wall portion, and the oil collecting portion and the through hole are formed radially outward of the lightening hole in the ring-shaped wall portion.

5. The power transmission device according to claim 4, wherein the other rotation element is a counter drive gear to which power is transmitted from the transmission, and the opening of the through hole facing the second space is located below the counter drive gear.

6. The power transmission device according to claim 5, wherein the other rotation element is supported on an outer peripheral surface of the boss portion through a bearing, the boss portion includes a lubricating hole for supplying lubricating oil to the bearing, and the lubricating oil is supplied from a radially inner side of the boss portion to the lubricating hole.

7. The power transmission device according to claim 6, wherein the brake includes a return spring for biasing the piston and a spring support member supporting the return spring and fixed to the support, and the spring support member includes a ring-shaped support portion supporting one end of the return spring and an oil collecting wall extending from the ring-shaped support portion and facing the through hole with an interval between the through hole and the oil collecting wall.

8. The power transmission device according to claim 1, wherein the ring-shaped wall portion has at least one lightening hole penetrating the ring-shaped wall portion, and the oil collecting portion and the through hole are formed radially outward of the lightening hole in the ring-shaped wall portion.

9. The power transmission device according to claim 1, wherein the other rotation element is a counter drive gear to which power is transmitted from the transmission, and the opening of the through hole facing the second space is located below the counter drive gear.

10. The power transmission device according to claim 1, wherein the other rotation element is supported on an outer peripheral surface of the boss portion through a bearing, the boss portion includes a lubricating hole for supplying lubricating oil to the bearing, and the lubricating oil is supplied from a radially inner side of the boss portion to the lubricating hole.

11. The power transmission device according to claim 1, wherein the brake includes a return spring for biasing the piston and a spring support member supporting the return spring and fixed to the support, and the spring support member includes a ring-shaped support portion supporting one end of the return spring and an oil collecting wall extending from the ring-shaped support portion and facing the through hole with an interval between the through hole and the oil collecting wall.

12. The power transmission device according to claim 2, wherein the ring-shaped wall portion has at least one lightening hole penetrating the ring-shaped wall portion, and the oil collecting portion and the through hole are formed radially outward of the lightening hole in the ring-shaped wall portion.

13. The power transmission device according to claim 2, wherein the other rotation element is a counter drive gear to which power is transmitted from the transmission, and the opening of the through hole facing the second space is located below the counter drive gear.

14. The power transmission device according to claim 2, wherein the other rotation element is supported on an outer peripheral surface of the boss portion through a bearing, the boss portion includes a lubricating hole for supplying lubricating oil to the bearing, and the lubricating oil is supplied from a radially inner side of the boss portion to the lubricating hole.

15. The power transmission device according to claim 2, wherein the brake includes a return spring for biasing the piston and a spring support member supporting the return spring and fixed to the support, and the spring support member includes a ring-shaped support portion supporting one end of the return spring and an oil collecting wall extending from the ring-shaped support portion and facing the through hole with an interval between the through hole and the oil collecting wall.

16. The power transmission device according to claim 3, wherein the other rotation element is supported on an outer peripheral surface of the boss portion through a bearing, the boss portion includes a lubricating hole for supplying lubricating oil to the bearing, and the lubricating oil is supplied from a radially inner side of the boss portion to the lubricating hole.

17. The power transmission device according to claim 3, wherein the other rotation element is supported on an outer peripheral surface of the boss portion through a bearing, the boss portion includes a lubricating hole for supplying lubricating oil to the bearing, and the lubricating oil is supplied from a radially inner side of the boss portion to the lubricating hole.

18. The power transmission device according to claim 3, wherein the brake includes a return spring for biasing the piston and a spring support member supporting the return spring and fixed to the support, and the spring support member includes a ring-shaped support portion supporting one end of the return spring and an oil collecting wall extending from the ring-shaped support portion and facing the through hole with an interval between the through hole and the oil collecting wall.

19. The power transmission device according to claim 4, wherein the other rotation element is supported on an outer peripheral surface of the boss portion through a bearing, the boss portion includes a lubricating hole for supplying lubricating oil to the bearing, and the lubricating oil is supplied from a radially inner side of the boss portion to the lubricating hole.

20. The power transmission device according to claim 4, wherein the brake includes a return spring for biasing the piston and a spring support member supporting the return spring and fixed to the support, and the spring support member includes a ring-shaped support portion supporting one end of the return spring and an oil collecting wall extending from the ring-shaped support portion and facing the through hole with an interval between the through hole and the oil collecting wall.

\* \* \* \* \*